(12) United States Patent
Muranaka et al.

(10) Patent No.: US 12,179,133 B2
(45) Date of Patent: *Dec. 31, 2024

(54) CHEMICAL SOLUTION SUPPLY SYSTEM AND CHEMICAL SOLUTION SUPPLY METHOD

(71) Applicant: Kioxia Corporation, Tokyo (JP)

(72) Inventors: Toshiyuki Muranaka, Yokkaichi Mie (JP); Yuichi Kuroda, Yokkaichi Mie (JP)

(73) Assignee: KIOXIA CORPORATION, Tokyo (JP)

( * ) Notice: Subject to any disclaimer, the term of this patent is extended or adjusted under 35 U.S.C. 154(b) by 294 days.

This patent is subject to a terminal disclaimer.

(21) Appl. No.: 17/407,618

(22) Filed: Aug. 20, 2021

(65) Prior Publication Data

US 2022/0258081 A1    Aug. 18, 2022

(30) Foreign Application Priority Data

Feb. 16, 2021   (JP) .................... 2021-022689

(51) Int. Cl.
| | | |
|---|---|---|
| *B01D 35/143* | (2006.01) | |
| *B01D 29/56* | (2006.01) | |
| *B01D 29/60* | (2006.01) | |
| *B01D 35/147* | (2006.01) | |
| *B01D 35/26* | (2006.01) | |

(52) U.S. Cl.
CPC ......... *B01D 35/1435* (2013.01); *B01D 29/56* (2013.01); *B01D 29/603* (2013.01); *B01D 35/1475* (2013.01); *B01D 35/26* (2013.01)

(58) Field of Classification Search
CPC ............ B01D 35/1435; B01D 35/1475; B01D 35/26; B01D 35/143; B01D 35/147; B01D 29/56; B01D 29/603; B01D 29/60; B01D 29/52; B01D 37/04
USPC .......................................... 210/739
See application file for complete search history.

(56) References Cited

U.S. PATENT DOCUMENTS

| | | | |
|---|---|---|---|
| 2003/0012709 A1 | 1/2003 | Xu et al. | |
| 2017/0340995 A1* | 11/2017 | Aida | ............... H01L 21/0206 |
| 2019/0144301 A1* | 5/2019 | Branum | ............. G06Q 20/14 |
| | | | 210/739 |

FOREIGN PATENT DOCUMENTS

| | | |
|---|---|---|
| JP | 2004-537400 A | 12/2004 |
| JP | 2008-080193 A | 4/2008 |
| JP | 2017-212373 A | 11/2017 |

\* cited by examiner

*Primary Examiner* — Akash K Varma
(74) *Attorney, Agent, or Firm* — Foley & Lardner LLP (57) ABSTRACT

According to one embodiment, there is provided a chemical solution supply system including: a tank configured to store a chemical solution; a first pipe connected to the tank and configured to provide the chemical solution; a first filter unit connected to the first pipe and having a first filter configured to filter the chemical solution; a second pipe connected to the first filter unit and configured to provide the chemical solution filtered by the first filter; and a detector connected to the first pipe and configured to detect foreign matter in the chemical solution in the first pipe.

12 Claims, 9 Drawing Sheets

CHEMICAL SOLUTION SUPPLY SYSTEM AND CHEMICAL SOLUTION SUPPLY METHOD

CROSS-REFERENCE TO RELATED APPLICATION

This application is based upon and claims the benefit of priority from Japanese Patent Application No. 2021-022689, filed Feb. 16, 2021, the entire contents of which are incorporated herein by reference.

FIELD

Embodiments described herein relate generally to a chemical solution supply system and a chemical solution supply method.

BACKGROUND

Chemical solutions are used in various manufacturing processes of a semiconductor device. As foreign matters are mixed in a chemical solution during the manufacturing process, a solution transporting process, or the like, a filter unit having a filter for removing such foreign matters is attached to a pipe for feeding the chemical solution.

DETAILED DESCRIPTION

Embodiments provide a chemical solution supply system and a chemical solution supply method in which a filter can be used in a sound state.

In general, according to an embodiment, there is provided a chemical solution supply system. The chemical solution supply system includes: a tank configured to store a chemical solution; a first pipe connected to the tank and configured to provide the chemical solution; a first filter unit connected to the first pipe and having a first filter configured to filter the chemical solution; a second pipe connected to the first filter unit and configured to provide the chemical solution filtered by the first filter; and a detector connected to the first pipe and configured to detect foreign matter in the chemical solution in the first pipe.

Hereinafter, embodiments will be described with reference to the drawings. In the drawings, the same or similar portions are designated by the same or similar reference numerals.

First Embodiment

A chemical solution supply system of the present embodiment includes a tank that stores a chemical solution; a first pipe that is connected to the tank and feeds the chemical solution; a first filter unit that is connected to the first pipe and has a first filter by which the chemical solution is filtered; a second pipe that is connected to the first filter unit and feeds the chemical solution filtered by the first filter; and an in-solution foreign matter detection device that is connected to the first pipe.

A chemical solution supply method of the present embodiment includes feeding a chemical solution from a tank for storing the chemical solution to a first filter unit having a first filter by using a first pipe connected to the tank; feeding the chemical solution filtered by the first filter by using a second pipe connected to the first filter unit; and determining quality of the first filter by using an amount of foreign (or extrinsic) matters in the chemical solution in the first pipe and a flow rate of the chemical solution.

Figure 1:
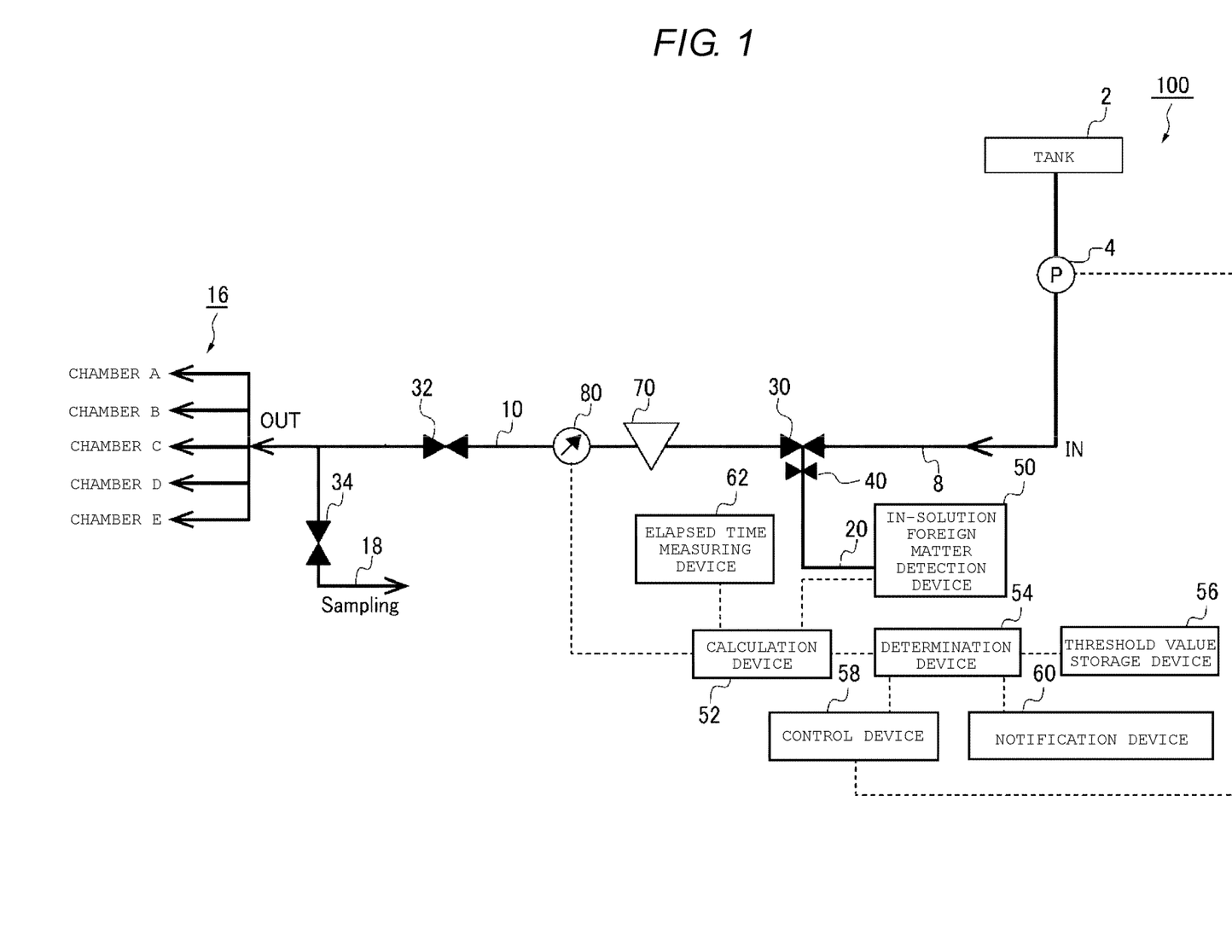
FIG. 1 is a schematic diagram of a chemical solution supply system of a first embodiment.
Figure 2A:
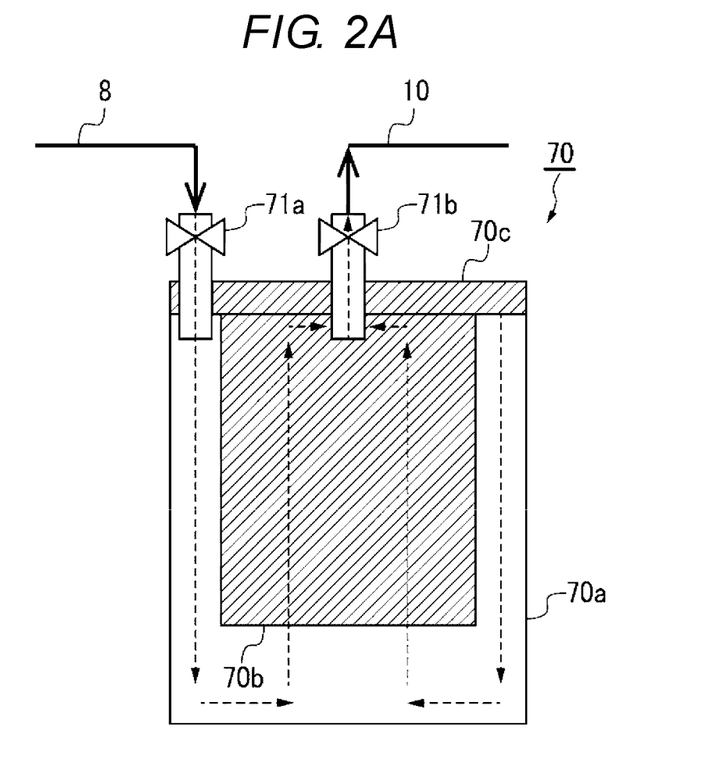
FIGS. 2A and 2B are schematic diagrams of a first filter unit of the first embodiment.
Figure 2B:
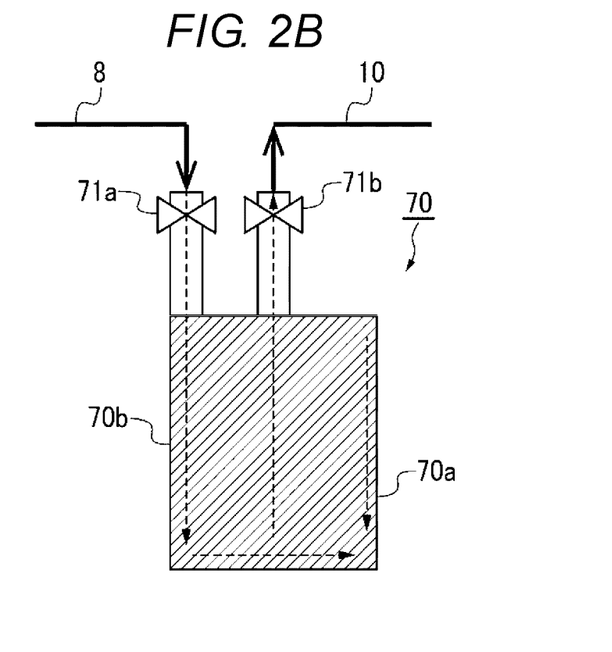

FIG. 1 is a schematic diagram of a chemical solution supply system of the present embodiment. FIGS. 2A and 2B are schematic diagrams of a filter unit of the present embodiment.

A chemical solution supply system 100 of the present embodiment will be described with reference to FIGS. 1, 2A, 2B, and 3.

The chemical solution supply system 100 includes a tank 2, a pump 4, a first pipe 8, a second pipe 10, a fifth pipe 16, a sixth pipe 18, a first valve 30, a second valve 32, a fifth valve 34, a sixth valve 40, an in-solution foreign matter detection device (detector) 50, a calculation device 52, a determination device 54, a threshold value storage device 56, a control device 58, a notification device 60, a first filter unit 70, and a flow meter 80.

The tank 2 is a tank for storing a chemical solution inside. The chemical solution is, for example, hydrochloric acid (HCl), sulfuric acid ($H_2SO_4$), de-ionized water (DIW: ultra-pure water), ammonia ($NH_3$) aqueous solution, acetic acid ($CH_3COOH$), hydrogen fluoride (HF) aqueous solution, isopropyl alcohol (IPA), or the like. However, it is not particularly limited to the above.

The first pipe 8 is connected to the tank 2 and the first filter unit 70. The first pipe 8 feeds the chemical solution in the tank 2 to the first filter unit.

The first pipe 8 is provided with the first valve 30.

FIG. 2A is a schematic diagram of a non-cartridge type first filter unit (an example of the filter unit) 70. The first filter unit 70 includes a first container 70a, a first filter 70b provided in the first container 70a, a lid 70c, a first filter unit connection valve 71a, and a second filter unit connection valve 71b. The first filter unit connection valve 71a is connected to the first pipe 8. The second filter unit connection valve 71b is connected to the second pipe 10. In a case where the first filter 70b is exchanged, the lid 70c is opened, the first filter 70b is taken out from the first container 70a, a new first filter 70b enters the first container 70a, and the lid 70c is tightened. The chemical solution enters the first container 70a from the first pipe 8 via the first filter unit connection valve 71a. The chemical solution that entered the first container 70a is filtered by the first filter 70b, for example, through routes as shown by dotted lines in FIG.

2A. After that, the chemical solution is supplied to the second pipe 10 via the second filter unit connection valve 71b.

FIG. 2B is a schematic diagram of the cartridge type first filter unit (an example of the filter unit) 70. The cartridge type first filter unit 70 has the first filter 70b inside the first container 70a. However, the first filter unit 70 does not have the lid 70c. Alternatively stated, the first container 70a and the first filter 70b are integrated, and when the first filter 70b is exchanged, the first filter unit 70 is exchanged together.

In the chemical solution supply system 100 of the embodiment, either the non-cartridge type first filter unit 70 shown in FIG. 2A or the cartridge type first filter unit 70 shown in FIG. 2B can also be preferably used.

The fifth pipe 16 is connected to the second pipe 10. The fifth pipe 16 supplies the chemical solution filtered by the first filter 70b to a chamber of a semiconductor manufacturing device. The semiconductor manufacturing device of the present embodiment has, for example, a "chamber A", a "chamber B", a "chamber C", a "chamber D", and a "chamber E". Here, the semiconductor manufacturing device is, for example, a single-wafer cleaning device, and the present disclosure is not limited thereto. The chemical solution supply system 100 of the present embodiment is a system for feeding the chemical solution after removing foreign matters by using a filter to such a semiconductor manufacturing device.

The flow meter 80 is provided in the second pipe 10. The flow meter 80 measures a flow rate of the chemical solution flowing in the second pipe 10.

The second pipe 10 is provided with the second valve 32.

The sixth pipe 18 is connected to the second pipe 10. The sixth pipe 18 is a pipe provided for sampling the chemical solution supplied to the semiconductor manufacturing device. The sixth pipe 18 is provided with the fifth valve 34.

A seventh pipe 20 is connected to the first pipe 8 via the first valve 30. The seventh pipe 20 is provided with the sixth valve 40.

The in-solution foreign matter detection device 50 is connected to the first pipe 8 via the seventh pipe 20 and the first valve 30. The in-solution foreign matter detection device 50 detects foreign matters in the chemical solution in the first pipe 8. The foreign matters are, for example, metal or silica (SiOx), but are not limited thereto.

For example, the in-solution foreign matter detection device 50 has a transparent flow path (not shown). The chemical solution is supplied to such a transparent flow path. The chemical solution flows through the transparent flow path to which the chemical solution is supplied, and is irradiated with a laser beam. After that, the in-solution foreign matter detection device 50 detects the foreign matters floating in the chemical solution in a transparent container by using a camera, a sensor, or the like (not shown). The mechanism of the in-solution foreign matter detection device 50 is not limited to this.

The calculation device 52 is connected to the flowmeter 80 and the in-solution foreign matter detection device 50. The calculation device 52 calculates a total number of particles passing through the filter by using an amount of the foreign matters in the chemical solution in the first pipe 8 measured by the in-solution foreign matter detection device 50, a usage time of the first filter 70b measured by an elapsed time measuring device 62, and a flow rate of the chemical solution flowing through the second pipe 10 measured by the flow meter 80. Here, the total number of particles passing through the filter is the total number of foreign matters that have passed through the first filter 70b, and is calculated by, for example, "total number of particles passing through the filter=foreign matters (counts/ml)×1000 (ml)×integrated flow rate (L)". The foreign matters (counts/ml) is the amount of the foreign matters in the chemical solution in the first pipe 8 detected by the in-solution foreign matter detection device 50. For example, consider a case where the flow rate of the chemical solution measured by the flowmeter 80 is constant. The usage time (time when the first filter 70b is used for filtering the chemical solution) of the first filter 70b is measured by the elapsed time measuring device 62. The elapsed time measuring device 62 is, for example, a stopwatch or a timepiece. Then, an integrated flow rate is calculated by obtaining a product of the flow rate measured by the flow meter 80 and the usage time measured by the elapsed time measuring device 62. The method of calculating the total number of particles passing through the filter is not limited to the above. For example, in a case where a time change of the flow rate in the second pipe 10 is large, the time change of the flow rate is measured in advance by using the flow meter 80 and the elapsed time measuring device 62. If the time change of the flow rate is measured, the calculation of the integrated flow rate (L) can be easily calculated by obtaining the integral of the flow rate with time.

The in-solution foreign matter detection device 50, the elapsed time measuring device 62, and the calculation device 52 function as an estimation unit of the total number of particles passing through the filter.

The flow rate of the chemical solution in the second pipe 10 can be measured by another method in addition to the method of measuring by using the flow meter 80. For example, the flow rate of the chemical solution in the second pipe 10 can be measured by using a change in the remaining amount of the chemical solution in the tank 2. Further, the flow rate of the chemical solution in the second pipe 10 can be measured by using, for example, a feed amount of the chemical solution of the pump 4.

The determination device 54 determines the quality of the first filter 70b by using the amount of the foreign matters in the chemical solution measured by the in-solution foreign matter detection device 50 and the flow rate of the chemical solution. For example, the determination device 54 determines the quality of the first filter 70b by using the total number of particles passing through the filter. However, the method by which the determination device 54 determines the quality of the first filter 70b is not limited to this.

The threshold value storage device 56 stores a threshold value for the determination device 54 to use for determining the quality of the first filter 70b.

The control device 58 controls the feed amount of the chemical solution to be fed to the first filter 70b by using, for example, the pump 4 based on the determination of the determination device 54. For example, the control device 58 can stop the pump 4 to stop the feeding of the chemical solution to the first filter. The control device 58 may control, for example, opening and closing of the first valve 30, the second valve 32, the fifth valve 34, and the sixth valve 40.

The notification device 60 issues a notification based on the quality of the first filter 70b of the determination device 54. The notification device 60 is a monitor for a chime, a siren, a lamp, a liquid crystal, or the like.

The calculation device 52, the determination device 54, and the control device 58 are, for example, electronic circuits. The calculation device 52, the determination device 54, and the control device 58 are, for example, a computer configured of a combination of hardware such as an arithmetic circuit and software such as a program or a programmed processor.

The threshold value storage device 56 is a hard disk drive, a semiconductor memory, or the like.

Figure 3:
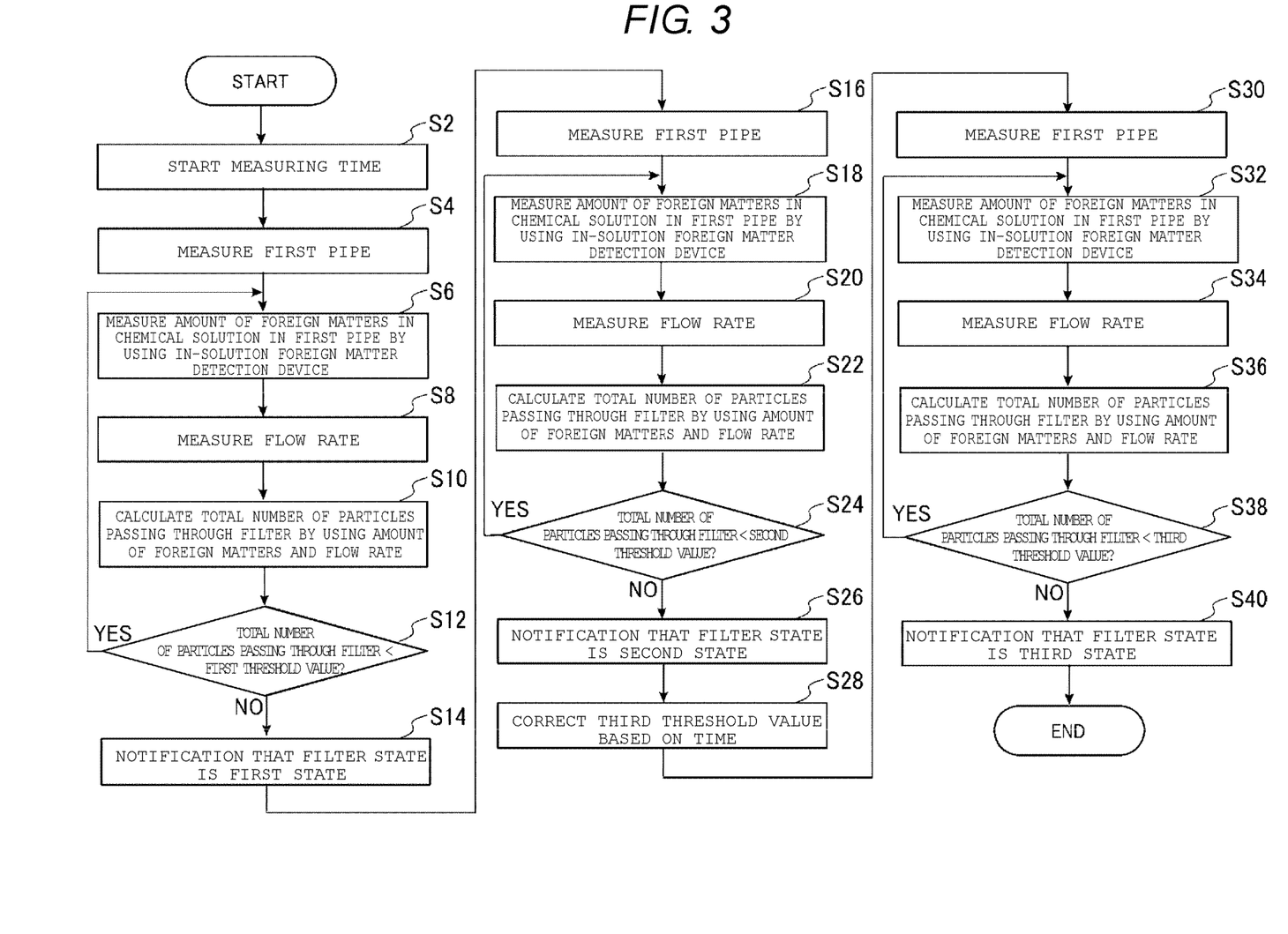
FIG. 3 is a flowchart of a chemical solution supply method of the first embodiment.

FIG. 3 is a flowchart of the chemical solution supply method of the present embodiment.

First, the elapsed time measuring device 62 starts measuring the time elapsed from the start of the chemical solution flowing through the first filter 70b (S2).

Next, the in-solution foreign matter detection device 50 measures the first pipe 8 (S4). Then, the in-solution foreign matter detection device 50 measures the amount of the foreign matters in the chemical solution in the first pipe 8 (S6).

Next, the flow rate of the second pipe 10 is measured (S8). For example, the flow rate of the second pipe 10 can be measured by using the flow meter 80 provided in the second pipe 10. However, the method of measuring the flow rate of the second pipe 10 is not limited to this.

Next, the calculation device 52 calculates the total number of particles passing through the filter, which have passed through the first filter 70b by using the amount of the foreign matters in the chemical solution in the first pipe 8 measured by the in-solution foreign matter detection device 50 and the flow rate of the chemical solution in the second pipe 10 (S10).

Next, the determination device 54 compares the total number of particles passing through the filter calculated by the calculation device 52 with a first threshold value (an example of the threshold value) stored in the threshold value storage device 56 and determines whether or not the total number of particles passing through the filter is smaller than the first threshold value (S12). In a case where the total number of particles passing through the filter is smaller than the first threshold value, the amount of the foreign matters in the chemical solution in the first pipe 8 is measured again (S6). On the other hand, in a case where the total number of particles passing through the filter is equal to or greater than the first threshold value, the notification device 60 performs a notification that a filter state is a first state (S14).

Next, the in-solution foreign matter detection device 50 measures the first pipe 8 (S16). Then, the in-solution foreign matter detection device 50 measures the amount of the foreign matters in the chemical solution in the first pipe 8 (S18). Next, the flow rate of the second pipe 10 is measured (S20). Next, the calculation device 52 calculates the total number of particles passing through the filter, which have passed through the first filter 70b by using the amount of the foreign matters in the chemical solution in the first pipe 8 measured by the in-solution foreign matter detection device 50 and the flow rate of the chemical solution in the second pipe 10 (S22).

Next, the determination device 54 compares the total number of particles passing through the filter calculated by the calculation device 52 with a second threshold value (an example of the threshold value) stored in the threshold value storage device 56, and determines whether or not the total number of particles passing through the filter is smaller than the second threshold value (S12). In a case where the total number of particles passing through the filter is smaller than the second threshold value, the amount of the foreign matters in the chemical solution in the first pipe 8 is measured again (S18). On the other hand, in a case where the total number of particles passing through the filter is equal to or greater than the second threshold value, the notification device 60 performs a notification that the filter state is a second state (S26).

Next, for example, the determination device 54 corrects a third threshold value based on the time from, for example, the notification (S14) that the filter state is the first state to the notification (S26) that the filter state is the second state (S28). For example, the determination device 54 lowers the third threshold value in a case where the time required is short. The above description is only an example. For example, the determination device 54 may correct the third threshold value based on the time from the notification that the filter state is the first state to the notification that the filter state is the second state.

Next, the in-solution foreign matter detection device 50 measures the first pipe 8 (S30). Then, the in-solution foreign matter detection device 50 measures the amount of the foreign matters in the chemical solution in the first pipe 8 (S32). Next, the flow rate of the second pipe 10 is measured (S34). Next, the calculation device 52 calculates the total number of particles passing through the filter, which have passed through the first filter 70b by using the amount of the foreign matters in the chemical solution in the first pipe 8 detected by the in-solution foreign matter detection device 50 and the flow rate of the chemical solution in the second pipe 10 (S36).

Next, the determination device 54 compares the total number of particles passing through the filter calculated by the calculation device 52 with the third threshold value (an example of the threshold value) stored in the threshold value storage device 56, and determines whether or not the total number of particles passing through the filter is smaller than the third threshold value (S38). In a case where the total number of particles passing through the filter is smaller than the third threshold value, the amount of the foreign matters in the chemical solution in the first pipe 8 is measured again (S32). On the other hand, in a case where the total number of particles passing through the filter is equal to or greater than the third threshold value, the notification device 60 performs a notification that the filter state is the third state (S40).

For example, the "first state" indicates that the first filter 70b is in an "exchange alert" state. For example, the "first state" indicates that the first filter 70b is still sufficiently usable, but is gradually deteriorating.

For example, the "second state" indicates that the first filter 70b is in an "exchange alarm" state. For example, the "second state" indicates that the exchange time of the first filter 70b is near.

For example, the "third state" indicates that the first filter 70b is in an "exchange" state. For example, the "third state" indicates that the first filter 70b is required to be exchanged.

Next, effects of the chemical solution supply system and the chemical solution supply method of the present embodiment are shown.

As a first comparative example, it is conceivable to measure pressures of the first pipe 8 and the second pipe 10, and determine whether or not the exchange of the first filter 70b is required based on a calculation of a differential pressure $\Delta P$ applied to the first filter 70b. That is, it is conceivable to determine whether or not a certain amount or more of the foreign matters is accumulated in the first filter 70b based on whether or not the differential pressure $\Delta P$ becomes larger than a predetermined pressure. Further, as a second comparative example, it is conceivable to determine whether or not a certain amount or more of the foreign matters is accumulated in the first filter 70b based on whether or not the first filter 70b has been used for a predetermined period or longer.

As described above, in the first comparative example and the second comparative example, it is indirectly determined whether or not a certain amount or more of the foreign matters is accumulated in the first filter 70b based on the differential pressure ΔP and/or the period of use. However, the differential pressure ΔP may decrease for reasons other than the accumulation of the foreign matters. Further, even if the first filter 70b is used for more than the predetermined period of use, the foreign matters may not be accumulated in a certain amount or more.

Figure 4A:
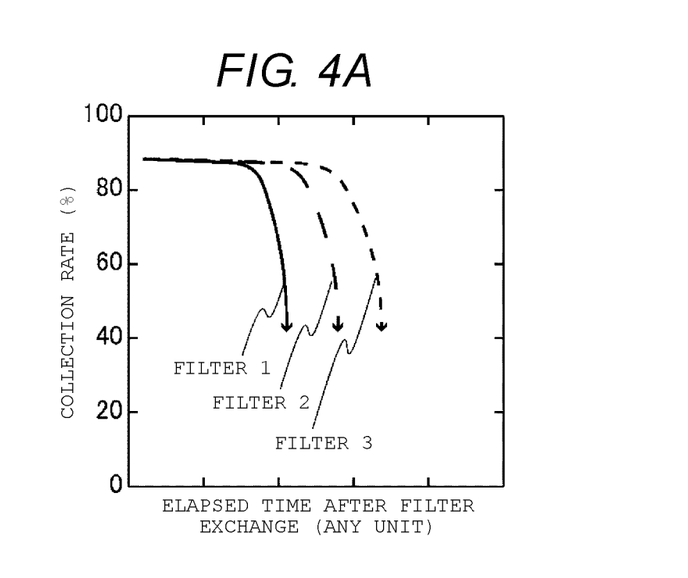
FIGS. 4A to 4C are schematic diagrams showing a relationship between a collection rate of foreign matters by a filter, an elapsed time after a filter exchange, and the total number of particles passing through the filter in the chemical solution supply system of the first embodiment.
Figure 4B:
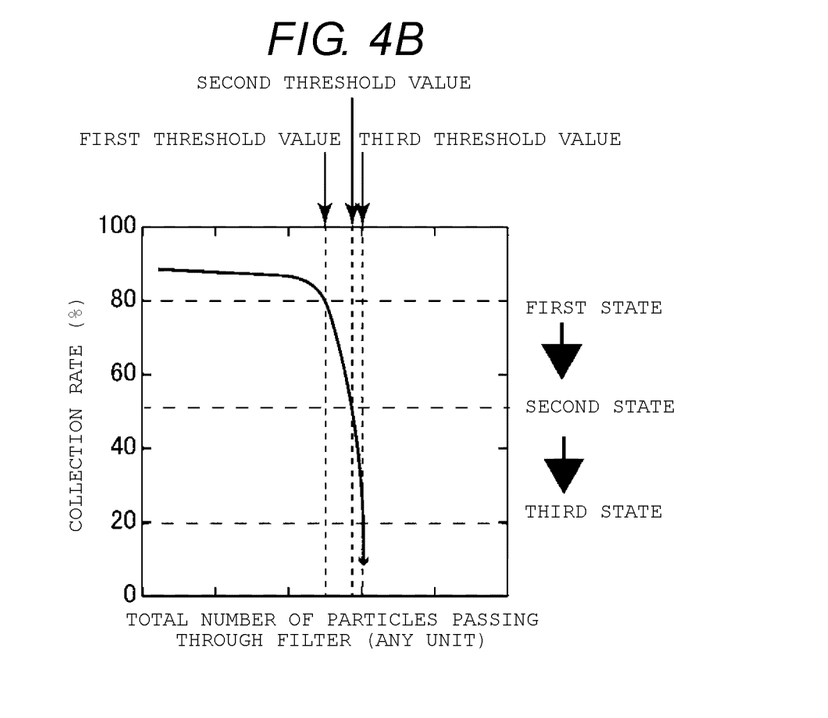
Figure 4C:
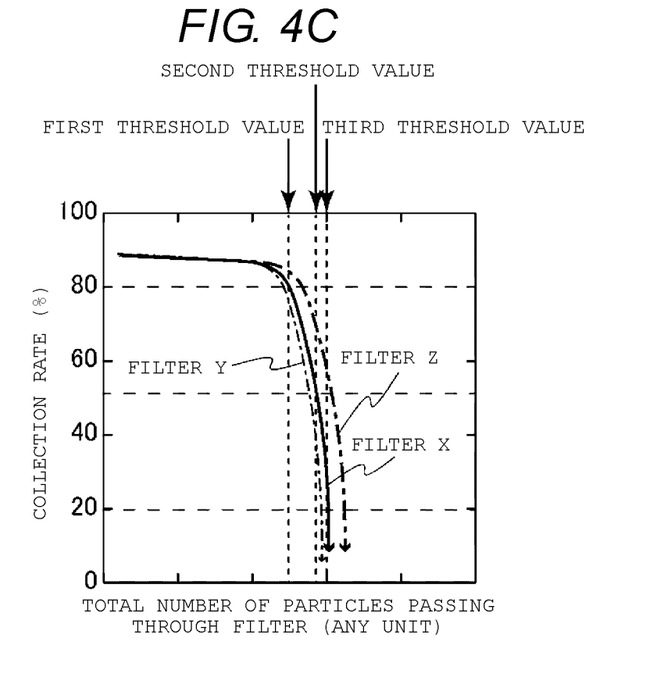

FIGS. 4A to 4C are schematic diagrams showing a relationship between a collection rate of foreign matters by the first filter 70b, the elapsed time after exchange of the first filter 70b, and the total number of particles passing through the filter in the chemical solution supply system 100 of the present embodiment.

FIG. 4A is a schematic diagram showing the relationship between the collection rate of the foreign matters by the first filter 70b and the elapsed time after the exchange of the first filter 70b in the chemical solution supply system 100 of the present embodiment. For example, in a case where there is a filter 1 in which the collection rate of the foreign matters decreases early even if the elapsed time is short, or a filter 3 in which the collection rate of the foreign matters does not decrease easily even if the elapsed time is long, it is not possible to properly estimate the filter exchange time based only on the elapsed time (period) after the filter is exchanged.

The chemical solution supply system of the present embodiment includes the tank 2 that stores the chemical solution, the first pipe 8 that is connected to the tank 2 and feeds the chemical solution, the first filter unit 70 that is connected to the first pipe 8 and has the first filter 70b for filtering the chemical solution, the second pipe 10 that is connected to the first filter unit 70 and feeds the chemical solution filtered by the first filter 70b, and the in-solution foreign matter detection device that is connected to the first pipe 8.

In the chemical solution supply system 100 of the present embodiment, the foreign matters in the chemical solution in the first pipe 8 are detected by using the in-solution foreign matter detection device 50 connected to the first pipe 8. In other words, the foreign matters in the chemical solution before entering the first filter 70b are detected. Therefore, the number of particles of foreign matters passing through the first filter 70b can be obtained, and the filter exchange time can be accurately determined. Therefore, it is possible to provide a chemical solution supply system in which the filter can be used in a sound state while suppressing the cost for exchanging the filter unnecessarily.

FIG. 4B is a schematic diagram showing the relationship between the collection rate of the foreign matters by the first filter 70b and the total number of particles passing through the filter in the chemical solution supply system 100 of the present embodiment. There is a good correlation between the collection rate and the total number of particles passing through the filter. Therefore, the exchange time of the filter can be accurately determined by using the number of particles of foreign matters passing through the first filter 70b.

It is preferable that the chemical solution supply system 100 of the present embodiment further includes the determination device 54 that determines the quality of the first filter 70b by using the amount of the foreign matters in the chemical solution measured by the in-solution foreign matter detection device 50 and the flow rate of the chemical solution. This is because the number of particles of foreign matters passing through the first filter 70b can be obtained more accurately by using the flow rate of the chemical solution.

Here, the flow rate can be measured by using, for example, the flow meter 80 provided in the second pipe 10. The second pipe 10 is a pipe through which the chemical solution that has passed through the first filter 70b flows. Therefore, by providing the flowmeter 80 in the second pipe 10, it is possible to determine the amount of the chemical solution that has actually passed through the first filter 70b. The flow rate may be measured by using the feed amount of the chemical solution of the pump that is provided in the first pipe 8 and feeds the chemical solution, or may be measured by using the change in the remaining amount of the chemical solution in the tank 2.

It is preferable that the chemical solution supply system 100 of the present embodiment further includes the control device 58 that controls the feed amount of the chemical solution supplied to the first filter 70b based on the determination result of the determination device 54. For example, if the feeding of the chemical solution is continued until a case where the exchange of the first filter 70b is required, the first filter 70b may be suddenly clogged. Therefore, for example, it is preferable to reduce the feed amount of the chemical solution as the foreign matters accumulate in the first filter 70b.

By providing the notification device 60 that issues a notification based on the quality of the first filter 70b of the determination device 54, an operator of the chemical solution supply system 100 can more easily grasp the exchange time of the first filter 70b.

By further providing the threshold value storage device 56 used for determining the quality of the first filter 70b, the determination of the determination device 54 can be performed with good reproducibility.

It is preferable that the determination device 54 corrects the third threshold value based on, for example, the time from the start of time measurement to the notification that the filter state is the second state. Further, the determination device 54 may correct the third threshold value based on the time from the notification that the filter state is the first state to the notification that the filter state is the second state. This is because even if the first filter 70b is managed based on the total number of particles passing through the filter, the filter lifetime can inevitably vary, so that the filter is accurately managed according to the rate of change of the filter state.

For example, consider managing the collection rate of the first filter 70b based on the total number of particles passing through the filter, assuming that the characteristics are similar to those of a "filter X" as shown in FIG. 4C. However, in reality, as in the case of a "filter Y" shown in FIG. 4C, it can be assumed a case where the collection rate decreases with a smaller total number of particles passing through the filter. Further, in reality, as in the case of a "filter Z" shown in FIG. 4C, it can be assumed a case where the collection rate decreases with a larger total number of particles passing through the filter. Therefore, for example, by modifying the threshold value such as the third threshold value, the filter is to be managed more accurately.

According to the chemical solution supply system and the chemical solution supply method of the present embodiment, it is possible to provide the chemical solution supply system and the chemical solution supply method in which the filter can be used in a sound state.

Second Embodiment

Figure 5:
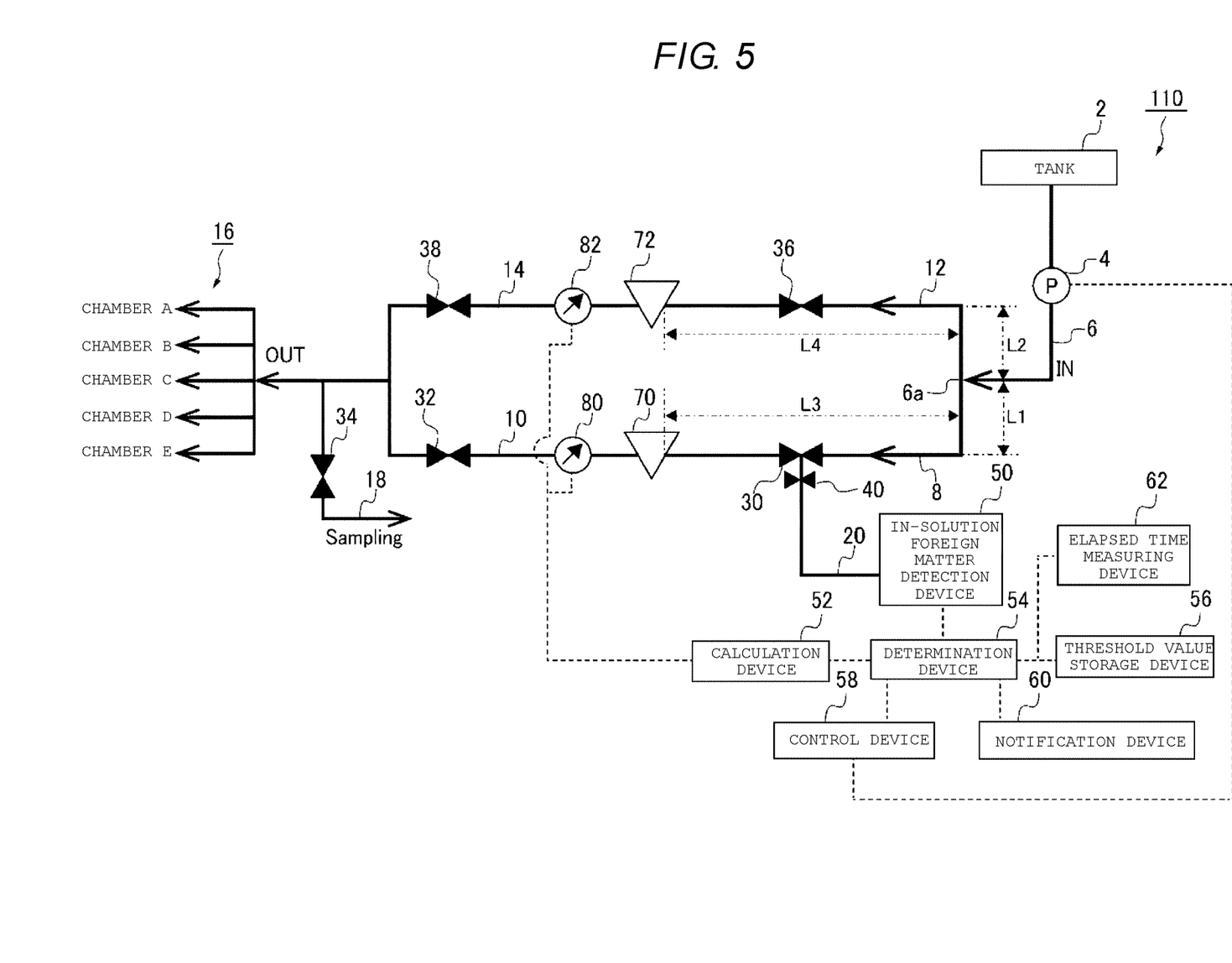
FIG. 5 is a schematic diagram of a chemical solution supply system of a second embodiment.

A chemical solution supply system 110 of the present embodiment is different from the chemical solution supply system 100 of the first embodiment in that there are provided a third pipe 12 that is connected to a tank 2, feeds the chemical solution, and has an identical pipe length as that of a first pipe 8, a second filter unit 72 that is connected to the third pipe 12 and has a second filter 72b by which the chemical solution is filtered, and a fourth pipe 14 that is connected to the second filter unit 72 and feeds the chemical solution filtered by the second filter 72b. Here, the description of the content overlapping with the first embodiment is omitted.

FIG. 5 is a schematic diagram of the chemical solution supply system 110 of the present embodiment. A pipe 6 is connected to the tank 2. A pump 4 is provided in the pipe 6. The first pipe 8 and the third pipe 12 are connected to a pipe end portion 6a of the pipe 6. That is, the first pipe 8 is connected to the tank 2 via the pipe 6. Further, the third pipe 12 is connected to the tank 2 via the pipe 6. A pipe length of the first pipe 8 is L1+L3. A pipe length of the third pipe 12 is L2+L4. Then, L1+L3=L2+L4. That is, the pipe length of the first pipe 8 and the pipe length of the third pipe 12 are equal.

The second filter unit 72 is connected to the third pipe 12.

The third pipe 12 is provided with a third valve 36.

Figure 6A:
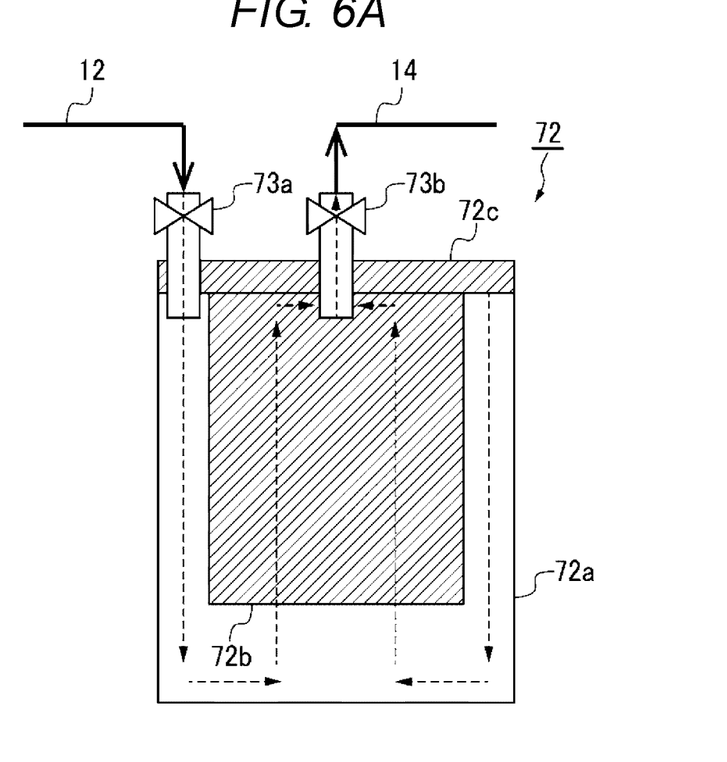
FIGS. 6A and 6B are schematic diagrams of a second filter unit of the second embodiment.

FIG. 6A is a schematic diagram of the non-cartridge type second filter unit 72. The second filter unit 72 includes a second container 72a, a second filter 72b provided in the second container 72a, a lid 72c, a third filter unit connection valve 73a, and a fourth filter unit connection valve 73b. The third filter unit connection valve 73a is connected to the third pipe 12. The fourth filter unit connection valve 73b is connected to the fourth pipe 14. In a case where the second filter 72b is exchanged, the lid 72c is opened, the second filter 72b is taken out from the second container 72a, a new second filter 72b enters the second container 72a, and the lid 72c is tightened. The chemical solution enters the second container 72a from the third pipe 12 via the third filter unit connection valve 73a. The chemical solution that entered the second container 72a is filtered by the second filter 72b, for example, through routes as shown by dotted lines in FIG. 6A. After that, the chemical solution is supplied to the fourth pipe 14 via the fourth filter unit connection valve 73b.

Figure 6B:
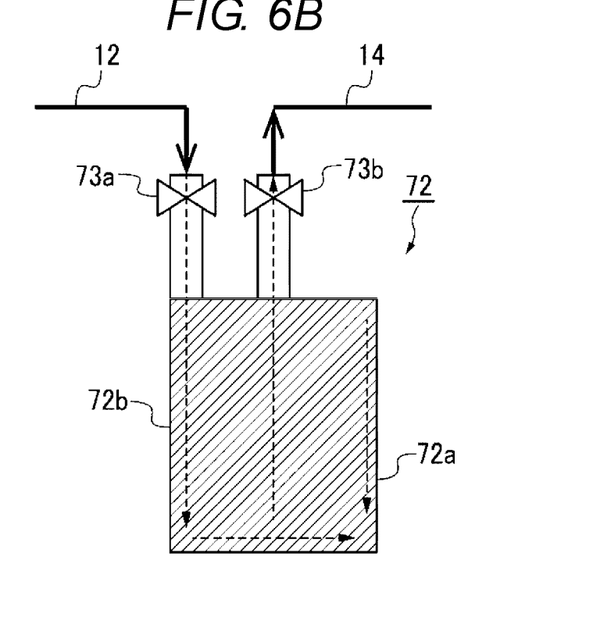

FIG. 6B is a schematic diagram of the cartridge type second filter unit 72. The cartridge type second filter unit 72 has the second filter 72b inside the second container 72a. However, the second filter unit 72 does not have the lid 72c. So to speak, the second container 72a and the second filter 72b are integrated, and when the second filter 72b is exchanged, the second filter unit 72 is exchanged together.

In the chemical solution supply system 110 of the embodiment, either the non-cartridge type second filter unit 72 shown in FIG. 6A or the cartridge type second filter unit 72 shown in FIG. 6B can also be preferably used.

In the chemical solution supply system 110 of the present embodiment, two filter units (first filter unit 70 and second filter unit 72) are provided. Therefore, for example, while the filter of one filter unit is exchanged, the supply of the chemical solution can be continued using the other filter unit. Here, if the lifetime of the first filter 70b and the lifetime of the second filter 72b are significantly different, it becomes difficult to make a plurality of filters available in a sound state.

Therefore, in the chemical solution supply system 110 of the present embodiment, the pipe length of the third pipe 12 and the pipe length of the first pipe 8 are made equal. Thereby, the difference between the flow rate of the chemical solution flowing through the first filter 70b and the flow rate of the chemical solution flowing through the second filter 72b can be further reduced. Therefore, the estimation units of the total number of particles passing through the filter (in-solution foreign matter detection device 50, elapsed time measuring device 62, and calculation device 52) are provided in one of the first pipe 8 corresponding to the first filter 70b and the third pipe 12 corresponding to the second filter 72b. Therefore, it is possible to use both filters in a sound state while suppressing the cost of exchanging the filters wastefully.

The in-solution foreign matter detection device 50 is not connected to the third pipe 12. As described above, in the chemical solution supply system 110 of the present embodiment, the difference between the flow rate of the chemical solution flowing through the first filter 70b and the flow rate of the chemical solution flowing through the second filter 72b can be further reduced. Therefore, it is considered that the difference between the total number of particles passing through the filter of the first filter 70b and the total number of particles passing through the filter of the second filter 72b is small. Therefore, the in-solution foreign matter detection device 50 may be connected only to the first pipe 8. In other words, it is not necessary to connect the in-solution foreign matter detection device 50 to the third pipe 12. In general, since the flow rate of the chemical solution flowing through the in-solution foreign matter detection device 50 is much smaller than the flow rate of the chemical solution flowing through the first pipe 8, the flow rate thereof can be ignored. The in-solution foreign matter detection device 50 may be provided in the third pipe instead of the first pipe 8.

According to the chemical solution supply system and the chemical solution supply method of the present embodiment, it is possible to provide a chemical solution supply system and a chemical solution supply method in which a plurality of filters can be used in a sound state.

Third Embodiment

Figure 7:
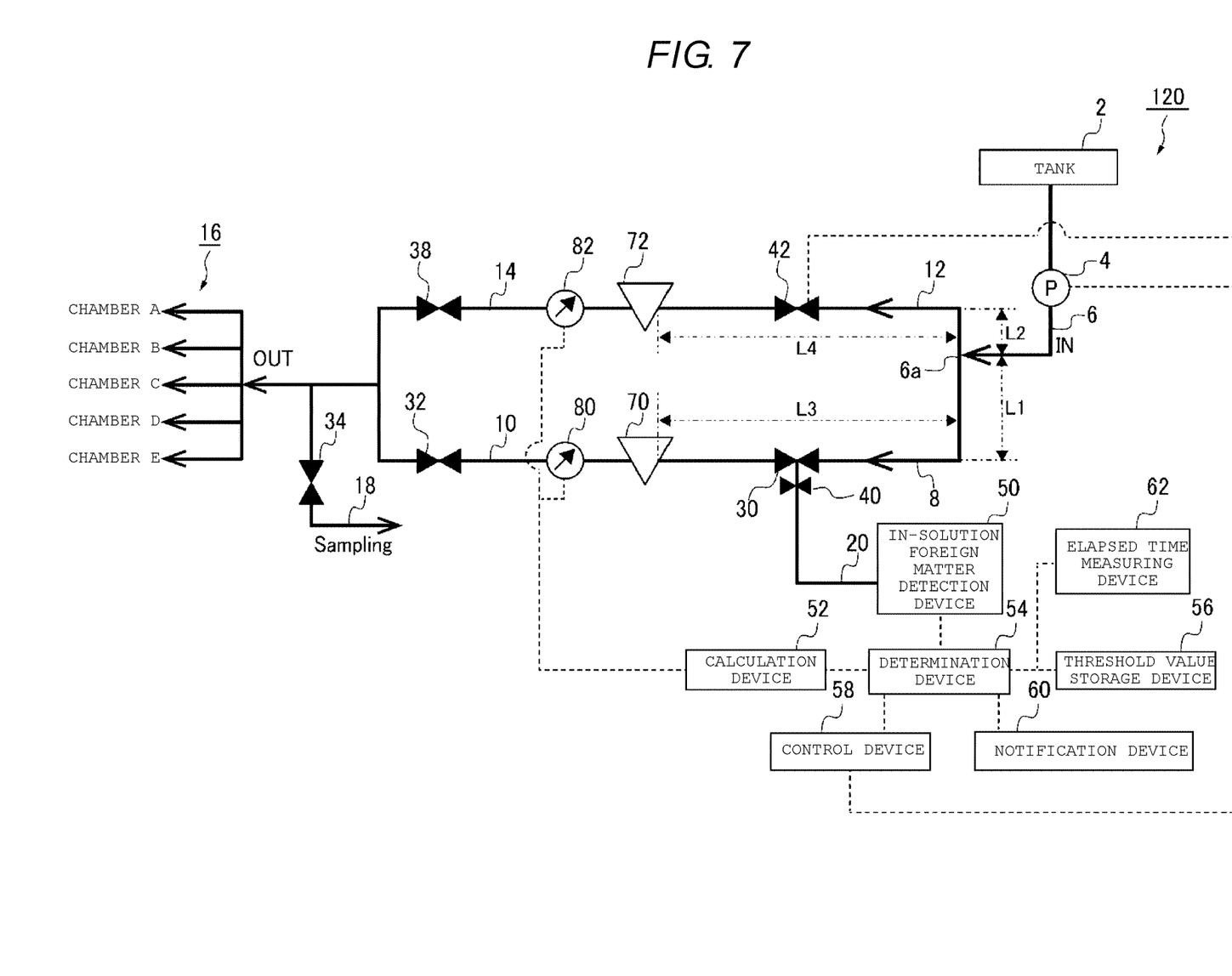
FIG. 7 is a schematic diagram of a chemical solution supply system of a third embodiment.

A chemical solution supply system 120 of the present embodiment is different from those of the first embodiment and the second embodiment in that there is further provided a third pipe 12 that is connected to the tank 2, feeds the chemical solution, has a pressure reducing valve 42, and has a shorter pipe length than that of the first pipe 8, a second filter unit 72 that is connected to the third pipe 12 and has a second filter 72b by which the chemical solution is filtered, and a fourth pipe 14 that is connected to the second filter unit 72 and feeds the chemical solution filtered by the second filter 72b. Here, the description of the contents overlapping with the first embodiment and the second embodiment will be omitted.

FIG. 7 is a schematic diagram of the chemical solution supply system 120 of the present embodiment. A pipe length of the first pipe 8 is L1+L3. A pipe length of the third pipe 12 is L2+L4. Then, L1+L3>L2+L4. That is, the pipe length of the third pipe 12 is shorter than the pipe length of the first pipe 8. Further, the third pipe 12 is provided with the pressure reducing valve 42 instead of the third valve 36.

Figure 8:
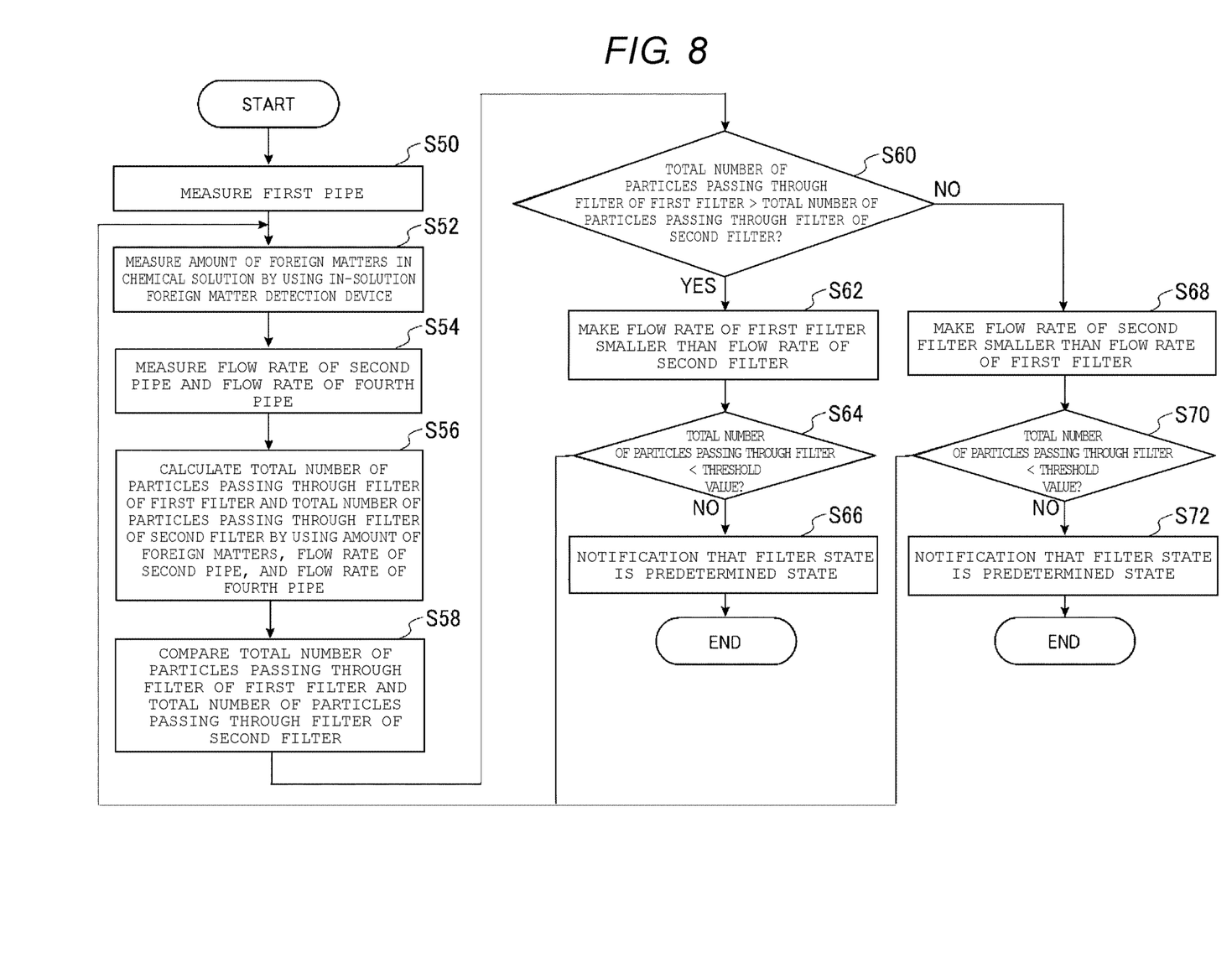
FIG. 8 is a flowchart of a chemical solution supply method of the third embodiment.

FIG. 8 is a flowchart of a chemical solution supply method of the present embodiment.

First, the in-solution foreign matter detection device 50 measures the first pipe 8 (S50). Then, the in-solution foreign matter detection device 50 measures the amount of the foreign matters in the chemical solution in the first pipe 8 (S52).

Next, the flow rate of the chemical solution in the second pipe 10 and the flow rate of the chemical solution in the fourth pipe 14 are measured (S8). For example, by using the flow meter 80 provided in the second pipe 10 and a flow meter 82 provided in the fourth pipe 14, the flow rate of the chemical solution in the second pipe 10 and the flow rate of the chemical solution in the fourth pipe 14 can be measured. However, the method of measuring the flow rate of the chemical solution in the second pipe 10 and the flow rate of the chemical solution in the fourth pipe 14 is not limited to this.

Next, the calculation device 52 calculates the total number of particles passing through the filter of the first filter 70b and the total number of particles passing through the filter of the second filter 72b by using the amount of the foreign matters in the chemical solution in the first pipe 8 detected by the in-solution foreign matter detection device 50, the flow rate of the chemical solution in the second pipe 10, and the flow rate of the chemical solution in the fourth pipe 14 (S56). Here, for example, the amount of the foreign matters in the third pipe 12 is assumed to be equal to the amount of the foreign matters in the first pipe 8. This is because the chemical solutions flowing through either the first pipe 8 or the third pipe 12 are stored in the same tank 2.

Next, the determination device 54 compares the total number of particles passing through the filter of the first filter 70b and the total number of particles passing through the filter of the second filter 72b (S58). In a case where the total number of particles passing through the filter of the first filter 70b is larger than the total number of particles passing through the filter of the second filter 72b, the determination device 54 uses the pressure reducing valve 42 to make the flow rate of the chemical solution filtered by the first filter 70b be smaller than the flow rate of the chemical solution filtered by the second filter 72b. On the other hand, when the total number of particles passing through the filter of the first filter 70b is equal to or less than the total number of particles passing through the filter of the second filter 72b, the pressure reducing valve 42 is used to make the flow rate of the chemical solution filtered by the second filter 72b be smaller than the flow rate of the chemical solution filtered by the first filter 70b (S60, S62, and S68).

Next, the determination device 54 determines whether or not the total number of particles passing through the filter is smaller than the threshold value stored in the threshold value storage device 56 (S64 and S70). In a case where the total number of particles passing through the filter is smaller than the threshold value stored in the threshold value storage device 56, the in-solution foreign matter detection device 50 measures the first pipe 8 (S50). On the other hand, in a case where the total number of particles passing through the filter is equal to or greater than the threshold value stored in the threshold value storage device 56, a notification is performed to the effect that the filter state is a predetermined state (S66 and S72). Here, as the threshold value, for example, the first threshold value, the second threshold value, and the third threshold value described in the first embodiment can be preferably used. Further, the predetermined state can be, for example, the first state, the second state, and the third state described in the first embodiment.

The chemical solution supply system 120 of the present embodiment is useful in a case where the pipe length of the first pipe 8 and the pipe length of the third pipe 12 cannot be made equal due to a layout relationship of the device or the like. The reason why the pressure reducing valve 42 is provided in the third pipe 12 having a shorter pipe length is that the third pipe 12 having the shorter pipe length allows the chemical solution to flow more easily than the first pipe 8. Of course, a pressure reducing valve (not shown) may be further provided in the first pipe.

The chemical solution supply system and the chemical solution supply method of the present embodiment also make it possible to provide a chemical solution supply system and a chemical solution supply method in which a plurality of filters can be used in a sound state.

Although some embodiments and examples of the present disclosure are described, these embodiments and examples are presented as examples and are not intended to limit the scope of the disclosure. These novel embodiments can be implemented in various other aspects, and various omissions, exchanges, and changes can be made without departing from the gist of the disclosure. These embodiments and modifications thereof are included in the scope and gist of the disclosure, and are also included in the scope of the disclosure described in the claims and the equivalent scope thereof.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A chemical solution supply system comprising:
   a tank configured to store a chemical solution;
   a first pipe connected to the tank, the first pipe being configured to provide the chemical solution;
   a first filter unit connected to the first pipe, the first filter unit having a first filter configured to filter the chemical solution;
   a second pipe connected to the first filter unit, the second pipe being configured to provide the chemical solution filtered by the first filter;
   a further pipe directly connected to the first pipe;
   a valve provided on a first end of the further pipe;
   a detector directly connected to a second end of the further pipe, the detector being configured to detect an amount of foreign matter in the chemical solution in the first pipe wherein the further pipe is directly connected to the first pipe via the valve; and
   a calculation device configured to estimate a number of particles passing through the first filter based on the detected amount of the foreign matter in the chemical solution in the first pipe to determine a deterioration state of the first filter.

2. The chemical solution supply system according to claim 1, further comprising:
   determination circuitry configured to determine a quality of the first filter based on the amount of the foreign matter in the chemical solution and a flow rate of the chemical solution in the second pipe.

3. The chemical solution supply system according to claim 2, further comprising:
   a flow meter provided in the second pipe, the flow meter being configured to measure the flow rate.

4. The chemical solution supply system according to claim 2, further comprising:
   a pump provided in the first pipe, the pump being configured to provide the chemical solution,
   wherein the flow rate is measured based on an amount of the chemical solution provided by the pump.

5. The chemical solution supply system according to claim 2, further comprising:
control circuitry configured to control an amount of the chemical solution provided to the first filter based on the quality of the first filter.

6. The chemical solution supply system according to claim 2, further comprising:
a notification device configured to issue a notification based on the quality of the first filter.

7. The chemical solution supply system according to claim 2, further comprising:
a threshold value storage device configured to store one or more threshold values for determining the quality of the first filter.

8. The chemical solution supply system according to claim 1, further comprising:
a third pipe connected to the tank, the third pipe being configured to provide the chemical solution, wherein the third pipe and the first pipe have an identical pipe length;
a second filter unit connected to the third pipe, the second filter unit having a second filter configured to filter the chemical solution; and
a fourth pipe connected to the second filter unit, the fourth pipe being configured to provide the chemical solution filtered by the second filter.

9. The chemical solution supply system according to claim 1, further comprising:
a third pipe connected to the tank, the third pipe being configured to feed the chemical solution, wherein the third pipe has a pressure reducing valve, and the third pipe has a pipe length shorter than a pipe length of the first pipe;
a second filter unit connected to the third pipe, the second filter unit having a second filter to filter the chemical solution; and
a fourth pipe connected to the second filter unit, the fourth pipe being configured to provide the chemical solution filtered by the second filter.

10. The chemical solution supply system according to claim 1, wherein the chemical solution includes hydrochloric acid (HCl), sulfuric acid ($H_2SO_4$), de-ionized water (DIW: ultrapure water), ammonia ($NH_3$) aqueous solution, acetic acid ($CH_3COOH$), hydrogen fluoride (HF) aqueous solution, or isopropyl alcohol (IPA).

11. The chemical solution supply system according to claim 1, further comprising:
determination circuitry configured to determine a quality of the first filter as a state based on the number of particles passing through the first filter being equal to or greater than a threshold value.

12. The chemical solution supply system according to claim 1, further comprising determination circuitry configured to:
determine whether the estimated number of particles passing through the first filter is greater than or equal to a first threshold value; and
in response to determining that the estimated number of particles passing through the first filter is greater than or equal to the first threshold value, determine the deterioration state of the first filter as a first state.

* * * * *